3,071,615
PROCESS FOR PARTIALLY DEHALOGENATING DI- AND TRIHALOACETIC ACID
Wolfgang Opitz and Kurt Sennewald, Knapsack, near Koln, Germany, assignors to Knapsack-Griesheim Aktiengesellschaft, Knapsack, near Koln, Germany, a corporation of Germany
Filed July 17, 1959, Ser. No. 827,948
Claims priority, application Germany July 28, 1958
9 Claims. (Cl. 260—539)

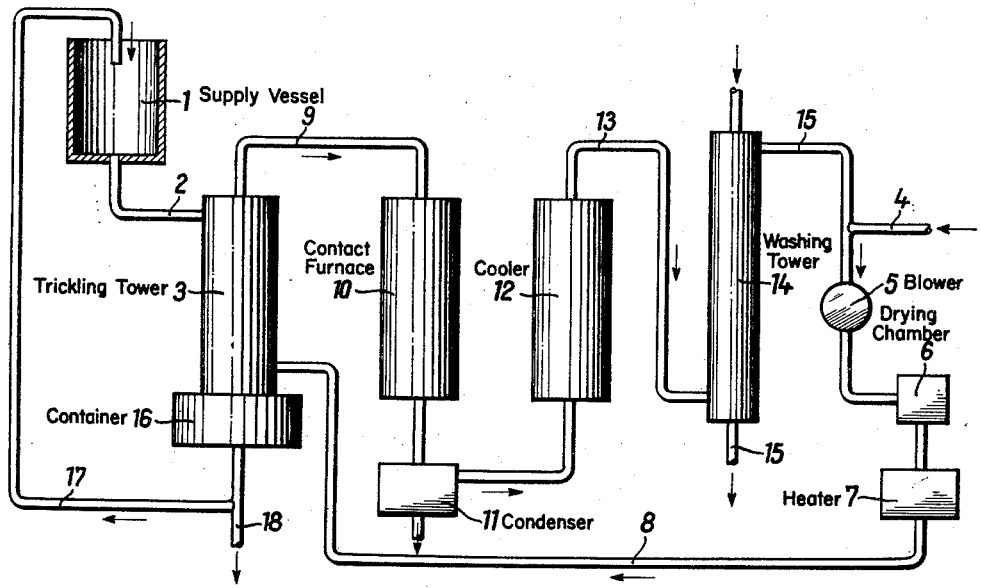

The present invention relates to a process for partially dehalogenating di- and trihaloacetic acid.

In the preparation of monohaloacetic acid, for example in the direct chlorination of acetic acid resulting in the formation of monochloroacetic acid, dichloroacetic acid and trihloroaetic acid are obtained as by-products. The formation of these by-products taking place, for example, when monochloroacetic acid is continuously prepared on an industrial scale is kept within bounds by continuously withdrawing about 10 to 15% of the chlorination liquid from the cycle. The chlorination liquid that has been withdrawn and which in addition to di- and trichloroacetic acid contains monochloroacetic acid and acetic acid that has not undergone conversion can be worked up by complete chlorination to yield trichloroacetic acid from which sodium trichloroacetate may, for example, be obtained. Since, however, the demand for trichloroacetic acid is relatively small the major portion of the chlorination liquid is waste product and has to be destroyed.

U.S. Patent 2,671,803 describes a method of working up the worthless chlorination liquid in a profitable way by passing it in the vaporous state at a temperature within the range of 180° to 250° C. in the presence of hydrogen over a suitable catalyst wherey the mixture is almost completely converted into acetic acid.

Apart from the fact that the demand for acetic acid can completely be met in other ways the process has the disadvantage that, due to a considerable resinification, the catalyst becomes inactive already after having been in operation for about two weeks. It has to be regenerated by burning off the polymerization products. As is known by experience such a regeneration can be brought about only once or twice. Then the catalyst is resinified to such an extent that a further burning off would completely destroy the catalyst. Consequently the noble metal catalyst which is relatively expensive has but a short life.

Now we have found that the dehalogenation can be conducted partially so that, for example, the chlorination liquid is not converted into acetic acid but into monochloroacetic acid. Such a partial dehalogenation is brought about by passing di- and tri-haloacetic acid, if desired one in admixture with the other, in the vaporous state at temperatures below 150° C. in the presence of hydrogen over a hydrogenation catalyst. Depending on the reaction temperature, the dehalogenation can be conducted either so as to result mainly in the formation of the monohalogen compound or so as to result mainly in the formation of the dihalogen compound. When the dechlorination is carried out, for example, at temperatures within the range of 100° to 140° C., preferably within the range of 110° to 120° C., it is mainly the monochlorine compound that forms whereas when temperatures within the range of 60° to 100° C., preferably within the range of 70° to 80° C., are applied it is mainly the dichlorine compound that forms. When a debromination is to be carried out the favorable working temperatures are a little lower. In this case the monobromine compound is mainly formed at a temperature within the range of 60° to 100° C., preferably 75° to 85° C.

Although for technical reasons the quantity of material processed per hour and per quantity of catalyst is advantageously as large as possible it appeared that in the process of the present invention the catalyst is preferably charged per liter and per hour with no more than up to about 50 grams of halogen capable of being split off. Otherwise the mono- or dihalogen compounds formed by the partial dehalogenation would not be obtained in a quantitative yield. In order to obtain this optimum throughput at the relatively low temperatures of operating the vapors of the starting material or the mixture of the starting materials have to be passed over the catalyst by means of a carrier gas which suitably is hydrogen. The process may also be carried out under reduced pressure. This is, however, difficult for technical reasons when the process is carried out continuously.

The starting substances are preferably used in the form of solutions. This will facilitate the evaporation of the starting material and prevent the apparatus from being clogged by reaction product that crystallizes out. As solvent there is advantageously used acetic acid. The quantity of solvent or diluent to be used depends on the solidification point of the final reaction products which when no solvents are added is, for example, within the range of about 50° to 60° C. in the case of products principally containing monochloroacetic acid and within the range of 35° to 45° C. in the case of products principally containing monobromacetic acid.

Particularly suitable hydrogenation catalysts are the metals of group VIII of the periodic table which may be used alone or in admixture with one another or in alloys with one another. The aforesaid metals may be supported on a carrier such as silicic acid in the form of their salts. Suitable catalysts for use in the process of the invention are many of the well-known hydrogenation catalyts, especially metals of the platinum group, i.e. platinum, iridium, ruthenium, rhodium, palladium or osmium, said metals being employed either alone or in combination with each other or as alloys.

In the process of the present invention, only a small resinification and inactivation of the catalyst have taken place after a prolonged time, owing to the relatively low working temperatures. Accordingly, the catalyst only has to be regenerated after having been used for about 2 months. The regeneration can be brought about in a simple way as described in the following paragraph and it can be repeated as often as desired.

The temperature in the contact furnace is reduced to about 50° C., without the introduction of the vapors of haloacetic acid being interrupted. At the aforesaid temperature no dehalogenation takes place. On the contrary, the vapors condense on the surface of the catalyst and the resinification products are washed off. At low temperatures the resinification products are soluble in the acids so that the end of the regeneration can be recognized by the coloration of the solution. Whereas in the beginning the liquid that flows off is dark, the liquid flowing off after about 2 to 3 hours is practically colorless. When the temperature is re-increased dehalogenation sets in again.

The process according to the present invention is particularly suitable for use when the chlorination liquid which is a recycled liquid and which is obtained in the continuous preparation of monochloroacetic acid by direct chlorination of acetic acid is likewise to be converted into monochloroacetic acid. Owing to the simple way of handling the catalyst this process is very economical and not more expensive than the necessary destruction of the circulating liquid. Accordingly, the process of the invention enables the yield obtained in the known chlorination of acetic acid resulting in the formation of monochloroacetic acid to be considerably increased.

In the same way bromoacetic acids can be partially debrominated. For example, chemically pure dibromoacetic acid as well as the bromination liquid consisting of a mixture of mono- and di-bromoacetic acid obtained in the bromination of acetic can be converted into monobromoacetic acid by the process of the invention. The nonhomogeneous mixtures forming in the direct bromination can in this way be worked up into pure homogeneous products as are often required when organic syntheses are carried out.

One method of carrying out the process of the invention is illustrated by way of example in the accompanying drawing which is a flow diagram showing the dehalogenation of the circulating liquid resulting in the formation of monochloroacetic acid.

Referring to the drawing, a recycled liquid as obtained as by-product in the continuous direct chlorination of acetic acid resulting in the formation of monochloroacetic acid is conducted from a supply vessel 1 via a conduit 2 to a trickling tower 3 charged with filling material and provided at its bottom with a container 16. The liquid is introduced at the head of the trickling tower. Via a conduit 4 and by means of a blower 5 hydrogen is introduced into the apparatus. The hydrogen is dried in a silica gel installation 6, then heated by means of a heater 7 to a temperature within the range of about 120° to 140° C., conducted via a conduit 8 to the lower end of the trickling tower 3 into which it is introduced above the container 16 and ascends in counter-current with the recycled liquid trickling down. The recycled liquid is heated by the hot hydrogen gas and the hot gases travel together with the hydrogen gas, via a conduit 9 to the contact furnace 10 which contains the catalyst. In the contact furnace a temperature within the range of about 115° to 116° C. is maintained. By the action of the hydrogen present the portion of di- and trichloroacetic acid contained in the circulating liquid is dehalogenated at this temperature with the formation of hydrochloric acid to yield monochloroacetic acid. The vapors leaving the contact furnace are cooled in a cooler 12 by means of cold water. During this cooling treatment the monochloroacetic acid that has formed condenses and accumulates in a condenser 11 fed with warm water while the hydrogen chloride that has formed and the hydrogen that has not been consumed are drawn off at the head of the cooler 12 via a conduit 13 and introduced into the lower end of a washing tower 14 through which cold water is passed in counter-current. The monochloroacetic acid is drawn off from the condenser 11 as the final product. In the washing tower 14, the hydrogen chloride is washed out and then removed via 15 together with the wash water. The portion of hydrogen that has not been consumed is drawn off at the head of the washing tower 14 via 15 and returned via 5, 6, 7 and 8 to the trickling tower 3 together with fresh hydrogen.

The quantity of vapor passing over the catalyst can be regulated by varying the temperature in the heater 7, the quantity of hydrogen introduced and the quantity of circulating liquid flowing into the trickling tower 3. The portion of di- and trichloroacetic acid that has not evaporated accumulates in the container 16 disposed at the bottom of the trickling tower 3, from there it can be drawn off and pumped via a conduit 17 into the supply vessel 1.

Recycled liquid that is contaminated to a high degree, for example recycled liquid which has been used in the regeneration of the catalyst for dissolving the resinification products, can likewise be worked up without previous distillation. No damage is caused to the catalyst since the impurities or resinification products accumulate as sump products in the container 16. In this case the sump liquid is drawn off via 18.

The quantity of material with which the catalyst is charged depends on the composition of the recycled liquid and it is suitably such that the quantity of vapor passed over the catalyst per liter of catalyst and per hour does not contain more than 50 grams of halogen capable of being split off.

Particularities concerning the amount of the material that undergoes conversion and the yield can be gathered from the following examples. By yield there is understood in the examples the sum of the dehalogenation products and the hydrohalic acid that has formed divided by the sum of the recycled liquid and the hydrogen added for the purpose of hydrogenation. The hydrohalic acid is in each case determined by titration. The examples serve to illustrate the invention but they are not intended to limit it thereto.

*Example 1*

190 grams of a solution of chemically pure trichloroacetic acid in acetic acid, which solution consisted of 28.5% of trichloroacetic acid and
71.5% of acetic acid where introduced per hour into the contact furnace 10 which contained 580 cc. of catalyst prepared according to Expl. 1 of the U.S. Patent 2,671,803 by depositing palladium on granular silica gel, i.e. in a quantity of about 1% by weight, calculated on the volume of the carrying substance.

The catalyst was accordingly charged with 328 grams of material per liter and per hour. In the contact furnace the temperature was maintained at 75° C. and 800 liters of hydrogen serving as carrier gas were cycled per hour. The process was carried out under atmospheric pressure. The quantity of hydrogen which was consumed in the dechlorination was theoretically calculated from the composition of the starting solution, and continuously replenished. The dechlorination product accumulating in the condenser 11 had the following composition:

22.4% of dichloroacetic acid,
77.2% of acetic acid.

The yield amounted to 97.4%.

*Example 2*

129 grams of a solution of chemically pure trichloroacetic acid in acetic acid which contained 40.6% of trichloroacetic and
59.4% of acetic acid.

were passed per hour over 580 cc. of catalyst prepared according to Example 1. The catalyst was accordingly charged with 222 grams of material per liter and per hour. The temperature in the contact furnace was 80° C. and 800 liters per hour of nitrogen were used as carrier gas. Twice the amount of hydrogen which according to the theoretical calculation was necessary for hydrogenation was introduced continuously. A dechlorination product consisting of 34.3% of dichloroacetic acid
0.8% of monochloroacetic acid and
64.7% of acetic acid, was obtained in a yield of 96.6%.

*Example 3*

The process was carried out as described in Example 1 but the starting solution contained 47.6% of trichloroacetic acid and
52.4% of acetic acid.

The catalyst was charged with 188 grams of material per liter and per hour and the temperature was kept at 75° C.

A dechlorination product containing 41.2% of dichloroacetic acid,
0.2% of monochloroacetic and
58.3% of acetic acid, was obtained in a yield of 96.8%.

*Example 4*

The starting solution consisted of 53.2% of chemically pure dichloroacetic acid and
46.8% of acetic acid.

The solution was dechlorinated as described in Example 1 at a temperature within the range of 110° to 115° C., the catalyst being charged with 235 grams of material per liter and per hour. The final reaction product had the following composition:

45.2% of monochloroacetic acid,
54.6% of acetic acid.

The yield amounted to 97.2%.

*Example 5*

In the manner described in Example 1 a starting solution consisting of 83.6% of chemically pure dichloroacetic acid and
16.4% of acetic acid containing 2% of anhydride, was passed at a temperature within the range of 110° to 112° C. over a catalyst, the catalyst being charged with 198 grams of material per liter and per hour. A dechlorination product containing 79.0% of monochloroacetic acid,
0.1% of dichloroacetic acid and
20.6% of acetic acid, was obtained in a yield of 98.6%.

*Example 6*

The starting solution consisted of 89.1% of dichloroacetic acid and
10.8% of acetic acid.

The experiment was carried out as described in Example 1 at a temperature within the range of 110° to 111° C., the catalyst being charged with 214 grams of material per liter and per hour. The final reaction product that was obtained had the following composition:

85.4% of monochloroacetic acid,
0.3% of dichloroacetic acid and
13.9% of acetic acid.

The yield amounted to 99.1%.

*Example 7*

240 grams of recycled liquid consisting of 45.4% of monochloroacetic acid,
37.2% of dichloroacetic acid,
1.3% of trichloroacetic acid and
15.7% of acetic acid, were introduced per hour into the contact furnace 10 which contained 580 cc. of catalyst prepared according to Example 1. The catalyst was accordingly charged with 415 grams of material per liter and per hour. In the contact furnace a temperature within the range of 112° to 118° C. was maintained and 800 liters of hydrogen serving as carrier gas were cycled per hour. The hydrogen consumed in the course of the hydrogenation was continuously replenished. The experiment was carried out under atmospheric pressure. The quantity of hydrogen required for dechlorination was calculated from the quantity of the recycled liquid and its composition.

The hydrogenation product accumulating in the condenser 11 had the following composition:

81.9% of monochloroacetic acid,
0.3% of dichloroacetic acid,
17.5% of acetic acid.

The yield amounted to 99.5%.

*Example 8*

189 grams of a recycled liquid consisting of 40.3% of monochloroacetic acid,
42.4% of dichloroacetic acid,
1.4% of trichloroacetic acid and
15.4% of acetic acid, were passed per hour over 580 cc. of catalyst prepared according to Example 1, the catalyst being accordingly charged with 325 grams of material per liter and per hour. The temperature in the contact furnace was within the range of 112° to 116° C. and 800 liters of $CO_2$ serving as carrier was were used per hour. Twice the amount of hydrogen which according to theoretical calculation was necessary for hydrogenation was continuously introduced. A hydrogenation product consisting of 82.4% of monochloroacetic acid,
0.5% of dichloroacetic acid and
16.8% of acetic acid, was obtained in a yield of 94.3%.

*Example 9*

139 grams of a recycled liquid consisting of 42.4% of monochloroacetic acid,
48.0% of dichloroacetic acid,
1.5% of trichloroacetic acid and
7.7% of acetic acid, were passed per hour over 580 cc. of catalyst prepared according to Example 1, the catalyst being accordingly charged with 240 grams of material per liter and per hour. The temperature in the contact furnace was within the range of 118° to 120° C. 712 liters of hydrogen serving as carrier gas were introduced per hour. The quantity which according to theoretical calculation was necessary for hydrogenation of hydrogen was continuously replenished. A dechlorination product consisting of 89.9% of monochloroacetic acid,
0.8% of dichloroacetic acid and
9.2% of acetic acid, was obtained in yield of 96.8%.

*Example 10*

240 grams of a recycled liquid consisting of 48.2% of monochloroacetic acid,
42.7% of dichloroacetic acid,
1.5% of trichloroacetic acid and
0.3% of acetic acid, were passed per hour over 580 cc. of catalyst prepared according to Example 1, the catalyst being accordingly charged with 415 grams of material per liter and per hour. The temperature in the contact furnace was within the range of 115° to 116° C. The amount of hydrogen that according to the theoretical calculation was necessary for the hydrogenation was introduced continuously. The experiment was carried out under a reduced pressure of about 100 mm. of mercury, no carrier gas being used. A hydrogenation product consisting of 89.9% of monochloroacetic acid,
0.8% of dichloroacetic acid and
9.2% of acetic acid, was obtained in a yield of 96.6%.

Example 11

153 grams of a recycled liquid consisting of 34.2% of monochloroacetic acid,
41.6% of dichloroacetic acid,
17.2% of trichloroacetic acid and
6.3% of acetic acid, were passed per hour over 580 cc. of catalyst prepared according to Example 1. The catalyst was accordingly charged per liter and per hour with 260 grams of material. The temperature in the contact furnace was 75° C. and 356 liters of hydrogen serving as carrier gas were introduced per hour. The quantity of hydrogen that according to the theoretical calculation was necessary for the hydrogenation was introduced continuously. The dechlorination product that was obtained had the following composition:

35.6% of monochloroacetic acid,
56.0% of dichloroacetic acid,
1.0% of trichloroacetic acid,
6.6% of acetic acid.

Example 12

156 grams of a recycled liquid consisting of 27.5% of monochloroacetic acid,
31.1% of dichloroacetic acid,
33.7% of trichloroacetic acid and
4.8% of acetic acid, were passed per hour over 580 cc. of catalyst prepared according to Example 1. The catalyst was accordingly charged with 265 grams of material per liter and per hour. The temperature in the contact furnace was 70° C. 356 liters of hydrogen serving as carrier gas were introduced per hour. The theoretically calculated quantity of hydrogenation hydrogen was introduced continuously. A dechlorination product consisting of 33.9% of monochloroacetic acid,
56.7% of dichloroacetic acid,
3.2% of trichloroacetic acid and
5.3% of acetic acid, was obtained in a yield amounting to 97.2%.

Example 13

At a temperature of 80° C. a starting mixture consisting of 39.2% of chemically pure dibromoacetic acid and
60.8% of acetic acid containing 2% of anhydride, was passed per hour over 580 cc. of catalyst prepared according to Example 1 and which was charged with 254 grams of material per liter and per hour. 1425 liters of hydrogen serving as carrier gas were cycled per hour. The theoretically calculated quantity of hydrogenation hydrogen was introduced continuously as described above. The resulting debromination product which was obtained in a yield of 98.2% had the following composition:

29.1% of monobromoacetic acid,
0.1% of dibromoacetic acid,
70.5% of acetic acid.

Example 14

A recycled liquid obtained in the bromination of acetic acid and consisting of 58.4% of monobromoacetic acid,
31.3% of dibromoacetic acid and
10.3% of acetic acid.

was passed at 80° C. as described above over a catalyst prepared according to Example 1 and which was charged with 286 grams per liter and per hour. 1425 liters of hydrogen serving as carrier gas were used per hour. A debromination product consisting of 88.6% of monobromoacetic acid,
0.3% of dibromoacetic acid and
10.7% of acetic acid.

was obtained in a yield of 96.5%.

When the same starting material was passed at 90° C. over a catalyst so that the catalyst was charged with 267 grams of material per liter and per hour a debromination product consisting of 76.7% of monobromoacetic acid and
22.8% of acetic acid.

was obtained in a yield of 95.8%.

Example 15

A recycled liquid obtained in the bromination of acetic acid and consisting of 60.1% of monobromoacetic acid,
28.6% of dibromoacetic acid and
11.3% of acetic acid.

was used as starting solution and treated at a temperature of 80° C. The catalyst prepared according to Example 1 was charged with 224 grams of material per liter and per hour. As in Example 13, 1425 liters per hour of hydrogen served as carrier gas. The resulting debromination product had the following composition:

76.9% of monobromoacetic acid,
22.8% of acetic acid.

It was obtained in a yield amounting to 97.1%.

We claim:

1. A process for partially dehalogenating halogenoacetic acids selected from the group consisting of chloroacetic acids and bromoacetic acids containing more than one halogen atom per molecule of acetic acid by hydrogenation, which comprises passing a solution consisting of acetic acid and one substance selected from the group consisting of dichloroacetic acid, trichloroacetic acid, a mixture of mono-, di and trichloroacetic acid, dibromoacetic acid and a mixture of mono- and dibromoacetic acid into contact with a substance selected from the group consisting of hydrogen and a mixture of hydrogen and a carrier gas heated to a temperature within the range of 120° to 140° C., introducing the vapors and gases formed from this contact into contact with a catalyst selected from the group consisting of the metals of the platinum group at a temperature of about 60° to about 150° C. whereby the vaporous halogeno-acetic acids are partially dehalogenated to form the dehalogenated halogenoacetic acid and hydrogen chloride, condensing the halogenoacetic acid, absorbing the hydrogen chloride with water, combining the residual unreacted hydrogen with fresh hydrogen, and recycling the combined hydrogen to the hydrogen contact point with said solution.

2. A process as claimed in claim 1 wherein the acetic acid admixed with the halogenoacetic acid amounts to at least 0.3% by weight.

3. A process as claimed in claim 1 wherein trichloroacetic acid is dechlorinated to yield dichloroacetic acid by splitting off the chlorine atom at temperatures within the range of 60° C. to 100° C.

4. A process as claimed in claim 1 wherein one substance selected from the group consisting of dichloroacetic acid, trichloroacetic acid and a mixture thereof is dechlorinated to yield monochloroacetic acid by splitting off the chlorine atoms at temperatures within the range of 100° C. to 140° C.

5. A process as claimed in claim 1 wherein dibromoacetic acid is debrominated to yield monobromoacetic acid by splitting off the bromine atom at temperatures within the range of 60° to 100° C.

6. A process as claimed in claim 1 wherein the solution obtained when monochloroacetic acid is continuously prepared by direct chlorination of acetic acid, is dechlorinated to yield monochloroacetic acid by splitting off the chlorine atoms at temperatures within the range of 110° C. to 120° C.

7. A process as claimed in claim 1 wherein the catalyst is applied to a carrier.

8. A process as claimed in claim 1 wherein the vapors of the haloacetic acids are passed over the catalyst under normal pressure by means of a carrier gas selected from the group consisting of nitrogen, hydrogen and $CO_2$.

9. A process as claimed in claim 1 wherein the reaction is carried out under reduced pressure.

References Cited in the file of this patent

UNITED STATES PATENTS

| | | |
|---|---|---|
| 2,671,803 | Sennewald et al. | Mar. 9, 1954 |
| 2,863,917 | Rucker et al. | Dec. 9, 1958 |

OTHER REFERENCES

Busch et al.: Ber. Deut. Chem. 49, 1063–1071 (1916).
Baltzly et al.: J. Am. Chem. Soc. 68, 261–265 (1946).
Elving et al.: J. Am. Chem. Soc. 72, 3244–3246 (1950).
Elving et al.: J. Am. Chem. Soc. 73, 1717–1722 (1951).
(Copies in Scientific Library, Photocopies in Div. 38, 260–539.)

UNITED STATES PATENT OFFICE

CERTIFICATE OF CORRECTION

Patent No. 3,071,615 January 1, 1963

Wolfgang Opitz et al.

It is hereby certified that error appears in the above numbered patent requiring correction and that the said Letters Patent should read as corrected below.

Column 1, line 16, for "trihloroaetic" read -- trichloroacetic --; column 7, line 27, for "31.1%" read -- 33.1% --.

Signed and sealed this 24th day of September 1963.

(SEAL)
Attest:

ERNEST W. SWIDER
Attesting Officer

DAVID L. LADD
Commissioner of Patents